Dec. 22, 1942.   B. B. BAUER   2,305,598
CONVERSION OF WAVE MOTION INTO ELECTRICAL ENERGY
Filed April 7, 1941   5 Sheets-Sheet 1

INVENTOR.
BY Benjamin B. Bauer
Dawson, Ooms & Booth
Attorneys.

Dec. 22, 1942.   B. B. BAUER   2,305,598
CONVERSION OF WAVE MOTION INTO ELECTRICAL ENERGY
Filed April 7, 1941   5 Sheets-Sheet 4

Inventor:
Benjamin B. Bauer
By Dawson, Ooms & Booth
Attorneys

Dec. 22, 1942.  B. B. BAUER  2,305,598
CONVERSION OF WAVE MOTION INTO ELECTRICAL ENERGY
Filed April 7, 1941   5 Sheets-Sheet 5

Inventor
Benjamin B. Bauer
By Dawson, Coons & Brock
Attorneys

Patented Dec. 22, 1942

2,305,598

UNITED STATES PATENT OFFICE 2,305,598

CONVERSION OF WAVE MOTION INTO ELECTRICAL ENERGY

Benjamin B. Bauer, Chicago, Ill., assignor to S. N. Shure and Frances Shure, trustees, doing business as Shure Brothers, a partnership Application April 7, 1941, Serial No. 387,217

18 Claims. (Cl. 179—1)

This invention relates to apparatus for conversion of wave motion into electrical energy and the converse. More particularly it relates to instruments of unidirectional nature, i. e., in which the instrument is active preferentially in one direction only, throughout an extensive range of frequencies, being relatively inoperative in other directions. This application constitutes a continuation-in-part of my co-pending application, Serial No. 232,439 for "Conversion of wave motion into electrical energy, etc.," now Patent No. 2,237,298. Other copending applications which are also continuations-in-part of Serial No. 232,439 are Serial No. 387,215 entitled "Conversion of wave motion into electrical energy, etc.," filed April 7, 1941; Serial No. 387,216 entitled "Conversion of wave motion into electrical energy, etc.," filed April 7, 1941; and Serial No. 387,438 entitled "Conversion of wave motion into electrical energy, etc.," filed April 8, 1941.

Unidirectional operation has previously been obtained in both the transmitting and receiving transducers through a combination of a unit having a nondirectional (circular) polar sensitivity pattern with one having a bidirectional (cosine-law) polar sensitivity pattern. A combination of two such units causes the resulting polar sensitivity pattern to be unidirectional (cardioid) in shape, and it has been applied extensively in the past to transmitting antennas, microphone apparatus, etc. For this latter application, one of the units is commonly made to operate on the pressure component of the sound wave (pressure transducer) and the other upon the pressure-difference of the sound wave (velocity transducer). Addition or cancellation of the voltages generated in each unit occurs depending upon whether the incidence of sound is from the front (0° incidence) or from the rear (180° incidence) of the instrument. Obviously, the voltages generated by both units for the 180° incidence should be substantially equal and opposite in phase throughout the frequency range in which the cancellation is desired, which because of inherent differences in construction and operating principle is a difficult thing to obtain in microphones operating upon dissimilar components of the sound wave.

One important object of my invention is to provide a unidirectional transducer operating over a wide frequency range and comprising in part two transducing elements operating on the same component of the sound wave, thus doing away with the necessity of subtracting outputs of two transducing elements working on dissimilar components of the sound wave.

Another object is to provide a unidirectional transducer with marked unidirectional properties over the operating range of frequencies.

A further object is to obtain in instrument with unidirectional sensitivity pattern by the action of wave effects at two points in a sound wave, using one transducer element only. Other objects of my invention will become apparent as this specification proceeds.

My invention is principally applicable to production and reception of sound waves in air, although it will become apparent to those skilled in the art that it may be equally applicable to wave phenomena in other media. The transducer element or elements employed may be either of the reversible type, such as piezoelectric crystal, moving coil, moving armature or condenser type, or of the non-reversible type such as, for example, the carbon-type. The theory set forth herein is applicable to receiving apparatus, such as loudspeakers, as well as to transmitting apparatus such as microphones. If transducers of the reversible type are employed, one instrument could serve interchangeably, both as a transmitter and as a receiver.

Figure 1:
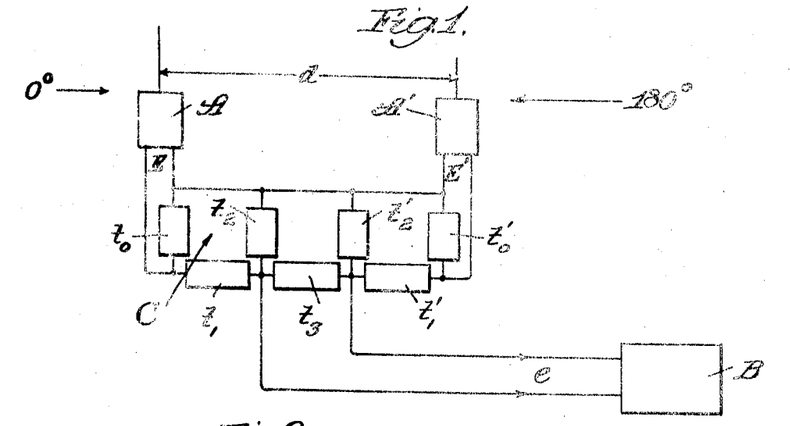
Figure 1 is a diagrammatic layout of generalized apparatus embodying my invention.

The nature of my invention is such that it can be best explained by reference to the following equivalent electrical networks and circuit equations. Fig. 1 is a schematic representation of two electroacoustic transducers A and A', generating respectively voltages E and E', and the interconnecting electrical network C. The transducers, which may operate on any function of the sound wave whatsoever, are spaced by an effective acoustical distance $d$ which in general should be smaller than, or comparable to, one-quarter wavelength of the highest frequency at which unidirectional action is desired, although it will be shown later that transducers may be constructed having unidirectional properties at frequencies higher than that specified above by virtue of diffraction and other wave effects. C is a generalized network shown in an equavalent $\pi$ section, composed of impedances $Z_0$, $Z_1$, $Z_2$, and $Z_0'$, $Z_1'$, and $Z_2'$. The impedance $Z_3$ is connected to the receiver B which may be an amplifier or any other receiving device. For simplicity, the internal impedances of the transducers A and A' are here considered negligible, although if this is not the case the proper internal impedances should be inserted in the network in carrying out the analysis.

The sound wave is considered as a plane wave which may be incident from any angle $\theta°$ from the normal 0° incidence indicated with the corresponding arrow in Fig. 1. The voltage developed by the transducers A and A' is indicated as E and E' respectively. Subscripts $\theta$, 0 and 180 are used to designate voltages developed from any angle of incidence $\theta°$, for normal front (0°) or for the rear (180°) incidence of sound, respectively. The respective voltages generated by the transducers A and A' will be displaced in phase by an angle given by the equation:

$$\phi = \frac{\omega d}{C_v} \cos \theta \qquad (I)$$

in which $\phi_\theta$ is the phase angle between the voltages E and E'
$\omega$ is the expression $2\pi f$
$f$ is the frequency, cycles per second
$\theta$ is the angle of incidence of sound
$C_v$ is the velocity of the sound wave.

Applying circuit analysis to the equivalent circuit of Fig. 1, it may be shown that the voltage $e$ delivered to the receiving apparatus, is given by the equation:

$$e = \frac{\left(1+\frac{Z'_1}{Z'_2}\right)E - \left(1+\frac{Z_1}{Z_2}\right)E'}{\frac{Z_1}{Z_3}\left(1+\frac{Z'_1}{Z'_2}\right)+\left(1+\frac{Z_1}{Z_2}\right)\left(1+\frac{Z'_1}{Z'_2}\right)+\frac{Z'_1}{Z_3}\left(1+\frac{Z_1}{Z_2}\right)} \qquad (II)$$

It may be shown, furthermore, that the voltage drop across any branch in a network composed of linear elements, due to the action of two sources A and B connected at any two points, may always be expressed as the sum of the partial voltage drops due to each source acting alone.

Thus, for the network of Fig. 1, the portion of $e$ due to E can be expressed as PE where P is the coefficient of E in Equation II divided by the denominator, and the portion of $e$ due to E' can be expressed as ZE' where Z is the coefficient of E' in Equation II divided by the denominator. It is seen therefore that the expression for the voltage delivered to the receiving apparatus can be indicated in the form:

$$e = PE + QE' \qquad (III)$$

Any expression involving network elements, having the function of P and Q in Equation III, is herein called the network factor.

To obtain unidirectional action, the voltage $e_{180}$ should become zero. Therefore, the condition to be met is:

$$e_{180} = PE_{180} + QE'_{180} = 0 \qquad (IV)$$

and hence the relation between coefficients P and Q should be such that:

$$-\frac{P}{Q} = \frac{E'_{180}}{E_{180}} \qquad (V)$$

and the nature of the network components is to be chosen to substantially maintain this relation throughout the frequency range in which the unidirectional action is desired.

Equation V is perfectly general and may be applied to any unidirectional transducing system having two generators and an interconnecting network, delivering the translated energy to a receiver. For the particular case of the network of Fig. 1, the values of network factors P and Q specified above may be inserted into, e. g., (V), giving the following relationship to be fulfilled:

$$\frac{1+\frac{Z'_1}{Z'_2}}{1+\frac{Z_1}{Z_2}} = \frac{E'_{180}}{E_{180}} \qquad (VI)$$

Figures 2, 3:
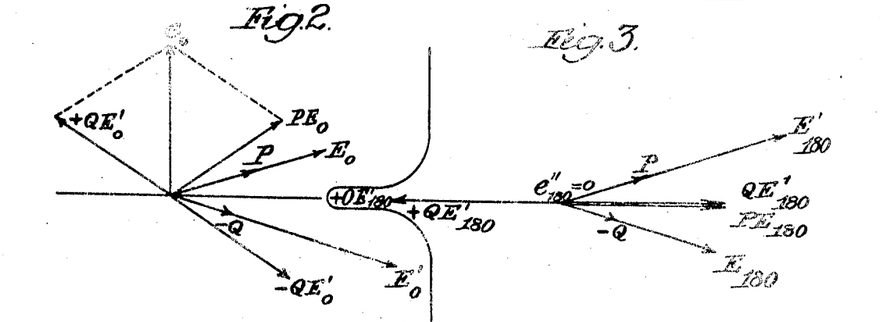
Fig. 2, a vector diagram showing the voltage relationships for a zero degree incidence of sound.
Fig. 3, a similar view to Fig. 2 but representing the 180° incidence of sound.

Before describing more specific embodiments of my invention, its operation will be further clarified by the following explanation made in reference to Figs. 2 and 3, which are vector diagrams representing the voltage relations for front and rear incidence of sound upon the instrument of Fig. 1.

For the purpose of explanation, it is assumed that voltages E and E', generated by the similar generators A and A', are of unequal magnitudes, although this is not necessarily the case. The voltage $E_0$ is shown leading the voltage $E'_0$ through an angle $\phi$ determined by Equation I, while the voltage $E_{180}$ is shown lagging behind $E'_{180}$ by the same angle, since reversal of the direction of incidence brings about reversal of the relative phase positions of the generated voltages. The network factors P and $-Q$ are shown of the same relative magnitudes and angular position as the rear (180°) incidence voltages $E'_{180}$ and $E_{180}$ respectively, as specified by Equation V.

The 0° (front-incidence) condition is shown in Fig. 2. The voltage $E_0$ is operated upon the vector P to give the vector $PE_0$ which is the contribution of the generator A to the total output voltage. The voltage $E'_0$ is operated upon by vector $-Q$ giving the vector $-QE_0$ which is the contribution of the generator A' to the total output voltage. $QE'_0$ is added to $PE_0$ giving the resultant output voltage $e_0$.

The (180°) rear incidence condition is shown in Fig. 3. The voltage $E_{180}$ is operated upon by the vector P giving the vector $PE_{180}$ which is the contribution of the generator A to the total output voltage. The voltage $E'_{180}$ is operated upon by the vector $-Q$ giving the vector $-QE'_{180}$ which is the contribution of the generator A' to the total output voltage. It should be noticed that for the rear incidence condition, the voltages $PE_{180}$ and $QE'_{180}$ are out of phase and of equal magnitude, and hence when the latter is added to the former, the resulting total output voltage is zero.

A specific example of network selection will be given in reference to Fig. 4. This network is the same as that of Fig. 1, with the following element values:

$$Z_0 = \infty$$
$$Z'_0 = \infty$$
$$Z_1 = R + j\omega L$$
$$Z_2 = \frac{1}{j\omega c} \quad \text{(VII)}$$
$$Z'_1 = R' + j\omega L'$$
$$Z'_2 = \frac{1}{j\omega c'}$$

It will be assumed here that the voltages E and E' are two vectors of equal magnitude and displaced by an angle $\phi$ whose value is determined from Equation I, their ratio being therefore equal to a unit vector at the angle $\phi$. Substituting this value of angle into the right hand side of Equation VI, and that of the network elements of (VII) into the lefthand side of Equation VI, it is evident that the desired relationship is:

$$\frac{1 - \omega^2 L'C' + j\omega C'R'}{1 - \omega^2 LC + j\omega CR} = \left|\frac{\omega d}{C_v}\right. \quad \text{(VIII)}$$

The lefthand member of the Equation VIII represents a quotient of two vectors, each of which may be made very nearly a vector operating at an angle proportional to frequency, if the relationship between resistance, inductance and capacitance is such that:

$$L = \frac{CR^2}{2} \text{ and } L' = \frac{C'R'^2}{2} \quad \text{(IX)}$$

since substituting these values into Equation IX gives the following relation:

$$\left|\frac{\omega d}{C_v}\right. = \frac{1 - \frac{\omega^2 C'^2 R'^2}{2} + j\omega C'R'}{1 - \frac{\omega^2 C^2 R^2}{2} + j\omega CR} \quad \text{(X)}$$

It should be observed that the numerator and the denominator of Equation X are the major terms of the expansion for the cosine and the sine functions: hence, as long as:

$$\omega C'R' \ll 1 \text{ and } \omega CR \ll 1 \quad \text{(XI)}$$

The Equation X may be rewritten $$\left|\frac{\omega d}{C_v}\right. = \frac{\cos \omega C'R' + j \sin \omega C'R'}{\cos \omega CR + j\omega \sin CR} = \cos \omega(R'C' - CR) +$$
$$j \sin \omega(C'R' - CR) = |\omega(C'R' - CR) \quad \text{(XII)}$$

The frequency term $\omega$ drops out of this equation, and therefore the condition for unidirectivity will be obtained if $$\frac{d}{C_v} = R'C' - RC \quad \text{(XIII)}$$

The distance $d$ and the velocity of sound $C_v$ being known, R, R', C, and C' may be selected by the use of Equation XIII. Then values of L and L' may be computed from Equation IX. Since the Equation XII holds as long as the expressions XI are true, then by choice of sufficiently small distance $d$, unidirectional action may be obtained throughout a wide range of frequencies. I have found that Equation XII is valid up to frequencies at which $d$ is not larger than one-quarter the wavelength of sound; thus, if $d$ is equal to approximately 1.5 cm., unidirectional action is obtained for all frequencies up to approximately 5,000 cycles per second.

The type of polar directivity pattern obtained with the use of my invention depends upon the operational principle of the transducers A and A'. This may be shown by solving the Equation V for Q and substituting into Equation III, which gives:

$$e = P\left(E - \frac{E_{180}}{E'_{180}}E'\right) = PE'\left(\frac{E}{E'} - \frac{E_{180}}{E'_{180}}\right) \quad \text{(XIV)}$$

Since A and A' are similar generators, the ratio of voltages E and E' will be a vector K having constant magnitude and acting at the angle $\phi_\theta$; therefore, the ratio of $E_{180}$ and $E'_{180}$ will be a vector K at an angle $\phi_{180}$; therefore:

$$e = PE'(K|\phi_\theta - K|\phi_{180}) = PE'K(|\phi_\theta - |\phi_{180}) \quad \text{(XV)}$$

The expression in parenthesis of Equation XV, at frequencies for which $d$ is small compared to one-quarter wavelength of sound, may be shown to approximately equal the algebraic sum of the angles $\phi_\theta$ and $\phi_{180}$. Substituting the values of these angles given by Equation I, $$e = PE'K\frac{\omega d}{C_v}(1 + \cos \theta) \quad \text{(XVI)}$$

If the character of the transducers A and A' is such that the voltage generated is independent of the incidence of sound (pressure-operated or non-directional transducers), the polar characteristic of the combination will be a cardioid of revolution expressed by the quantity in parenthesis in Equation XVI. This polar characteristic is shown graphically in solid line in Fig. 5.

If the voltage E and E' varies as the cosine of the angle of incidence, which will occur if transducers are of the bidirectional or "velocity-type," then $E' = E'_0 \cos \theta$ and:

$$e = PE'_0 K \frac{\omega d}{C_v}[\cos \theta(1 + \cos \theta)] \quad \text{(XVII)}$$

Figure 5:
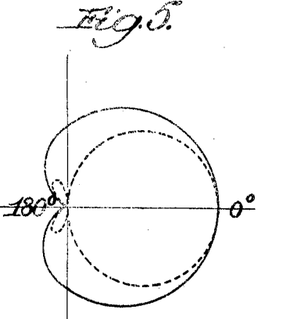
Fig. 5, a polar diagram illustrating the directional characteristics of the transducer of Fig. 4.

The quantity in brackets of Equation XVI represents the polar characteristic shown graphically in dotted lines in Fig. 5. It is seen, therefore, that combining two velocity-type transducers and the network described results in an electroacoustic transducing instrument of very marked unidirectional properties. It will be observed that my invention may make use of any two transducers operating on the same wave function, even if their transducing principles were dissimilar.

Instead of providing the electrical network directly at the output of the transducers, it is possible to first amplify these outputs with two independent amplifiers and combine the outputs after the amplification. This procedure would be considered of the nature of an equivalent.

Instead of employing two transducers and an electrical network to obtain unidirectional operation, my invention makes such operation possible through modifying wave disturbances at two points in space by means of equivalent acoustical networks and impressing these disturbances upon one electroacoustical transducer. Thus, the transducer is sensitive to one pressure component of a wave emanating from some source in the medium, which component acts through one of such points and is sensitive also to another pressure component of the wave, this latter component acting through the other of such points. An embodiment of my invention employing this alternative is shown in cross section and rear elevation in Figs. 6 and 7. The transducer assembly consists of a diaphragm 22 suitably supported in a casing 23 which also contains the piezoelectric crystal 24. The forces developed by sound pressure at the diaphragm are transmitted to the crystal by means of a connecting member 25, and the electrical energy developed therein is received from the crystal by means of conductors 47 and 48. The front side of the diaphragm is provided with an acoustical damping screen 26 constituted of a suitable wire-screen support having one or more thicknesses of cloth forming acoustical resistance and inertance. Between the diaphragm 22 and screen 26, there is a cavity 27 having an acoustical compliance C.

Figures 6, 7:
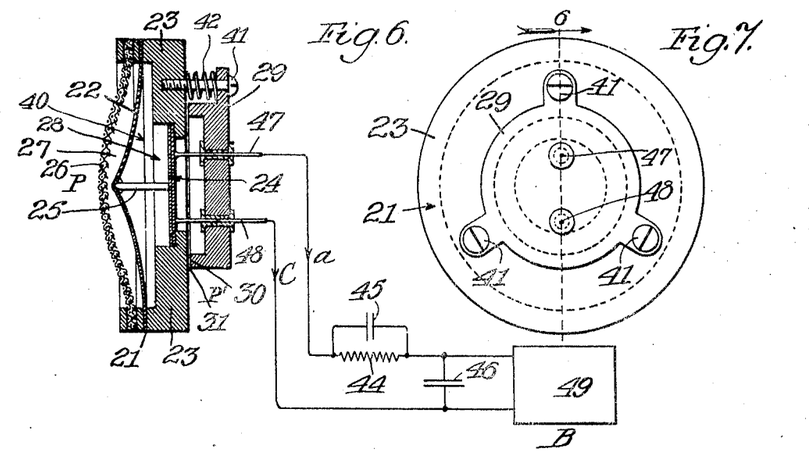
Fig. 6, a diagrammatic and sectional view of a unidirectional crystal microphone.
Fig. 7, a rear view in elevation of the same.

The casing 23 has a circular opening 28 which serves as a housing for the piezoelectric crystal and also forms part of the acoustical network. The housing 23, the back plate 29, and the diaphragm 22 provide a cavity 40, the crystal 24 not occupying the whole of the aperture in the housing. At the rear side of the case by means of screws 41 is held a cover 29 provided with ridge 30, the proper spacing being obtained by adjustment against compression of spring 42. Thus, a narrow passage 31 is formed, having acoustical resistance and an inertance. P denotes the sound pressure at the outside of the damping screen; P' denotes the sound pressure at the outside of the passage 31. The effective acoustical path between these pressures is called $d$. I have found that, at frequencies of sound for which the diameter of the casing 23 is smaller than one-half wavelength, the pressures P and P' are essentially equal and separated by a phase angle given by Equation I.

Figure 8:
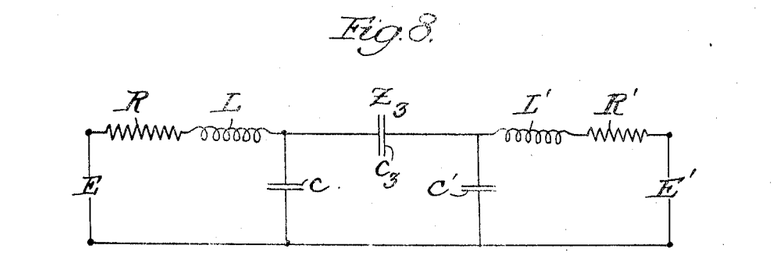
Fig. 8, an equivalent electrical circuit of the microphone shown in Fig. 6.

The equivalent electrical circuit of the transducer and its associated acoustical network appears in Fig. 8 in which R and L, and R' and L' are the acoustical resistances and inertances of the screen 26 and the passage 31, respectively; C and C' are acoustical compliances of the cavities 27 and 40 respectively. $Z_3$ is the impedance of the transducer element itself. As a simplifying assumption, the impedance $Z_3$ is considered as formed by the capacitance $C_3$ corresponding to the stiffness of the crystal 24, and the reactions of the medium are neglected. The voltage $e$ developed across $Z_3$ represents the resultant pressure upon the piezoelectric crystal. It may be observed that this equivalent circuit is entirely identical with that of Fig. 4, when the impedance $Z_3$ of Fig. 8 is perfectly general, as in Fig. 4. The complex impedance $Z_3$ in both figures includes the special case of a capacitance $C_3$ as shown explicitly in Fig. 8.

In the commonly used system of electroacoustic analogies pressure, volume velocity, inertance, acoustic capacitance and resistance are considered the analogies of voltage, current, inductance, capacitance and resistance respectively. This is because these acoustical quantities appear in the analysis of the behavior of acoustical circuits in precisely the way the corresponding electrical quantities appear in the analysis of analogous electrical circuits. The generalized circuit of Fig. 1 may therefore conveniently be used to illustrate the principle of operation of my invention in the special case in which a single transducer is used with acoustic means for modifying wave disturbances at two points in space to obtain unidirectional operation. In this case E and E' represent the effective sound pressures at the input to the two acoustic network branches separated by an effective acoustical distance $d$. In Figure 8, for example, E and E' represent the pressures $p$ and $p'$ of Fig. 6. The generalized network C is then an acoustical one and $Z_3$ is the effective acoustic impedance of the transducer. The voltage $e$ represents the effective pressure on the transducer which results from the combined effects of E and E' altered by acoustical network factors corresponding to P and Q as discussed above. All of the equations previously derived therefore apply to this case when the appropriate acoustic network elements are substituted for the electrical ones.

The acoustic capacitance, resistance and inertance terms are selected in reference to Equations IX and XIII to provide the unidirectional action desired. The terms R, L, and C due to screen 26 and cavity 27 are small compared with terms R', L' and C' due to passage 31 and cavity 40, hence the last term of the right hand side of Equation XIII will not have a great bearing upon the unidirectional action of the microphone. I have found that in some cases it is convenient to leave the damping screen 26 out altogether, and when this is done the constants R' and C' of the Equation XIII have to be readjusted slightly to compensate for disappearance of the last term. I have found that in a microphone with the casing 23 having a diameter of 6 cm. and the cavity 40 having a volume of 8 cc., the effective distance $d'$ is 3.5 cm. and satisfactory operation is obtained when the passage 31 has a circumferential length of 10 cm., a radial length of 0.1 cm. and a thickness of 0.01 cm. These dimensions give an approximate acoustic capacitance C' of $5.7 \times 10^{-6}$ cm.$^5$ per dyne and an approximate acoustic resistance of R' of 18 acoustical ohms. Since C', R' and $d'$ are not calculable with good degree of accuracy in terms of the physical dimensions of the instrument, I prefer to calculate the approximate dimensions for these terms, and obtain the final values by adjusting the thickness of the passage 31 by means of the screw 41 until correct unidirectional action is obtained. Obviously an alternative procedure would be to adjust instead the volume of the cavity 40 or the length of the distance $d$ which could be done by provisions for adjustably altering the size of the case 23.

The adjustment of the thickness of the passage 31 has a marked effect on the directional property of the microphone at low frequencies and therefore the provision of screws 41 to permit variations in this adjustment is desirable. In the specific structure described above a cardioid unidirectional characteristic is obtained with a passage thickness of only 0.01 cm. When this passage is closed, the sound wave has access only to the front of the diaphragm and the microphone functions as a conventional pressure operated microphone and is nondirectional at low frequencies.

In the case of a thin passage of the type here employed, the acoustic impedance, $Z_A$, is given approximately by $$Z_A = \frac{12ul}{t^3 L} + j\frac{6\rho lu}{5Lt} \quad \text{(XVIII)}$$

in which $u$ is the viscosity coefficient of the medium
$l$ is the passage length in cms. in the direction of flow
$t$ is the passage thickness in cms.
$L$ is the peripheral length of the passage
$\rho$ is the density of the medium in grams per cubic centimeter, and
$\omega$ is $2\pi$ times the frequency.

From this we note that the acoustic resistance varies inversely as the cube and the inertance inversely as the passage thickness. At low frequencies the reactance of the inertance is small and the phase shift is due almost entirely to R, C, R' and C'.

Figure 18:
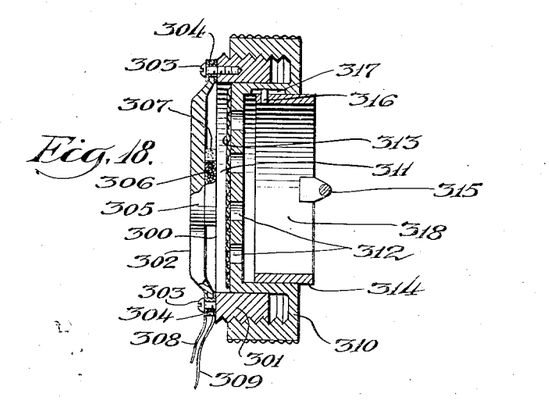
Fig. 18, an elevational sectional view of still another embodiment of the invention.

In Equation XII the left hand side, $\omega d/C_v$, represents the phase difference between E and E' which results from the time required for the sound wave to travel the distance $d$. The right hand side $\omega(C'R' - CR)$ represents the difference between the phase shift the pressure $p'$ experiences in passing through the rear acoustical network to the diaphragm and the phase shift the pressure $p$ experiences in passing through the front acoustical network to the diaphragm. If we define the quantity $k$ as $(C'R' - CR)C_v/d$ that is as the ratio of this difference to the phase difference between E' and E, then the resulting response of the microphone, $r$, in polar coordinates, in terms of the angle of sound incidence, $\theta$, is given by $r = p(k + \cos\theta)$ where $p$ is proportional to the maximum pressure of the sound wave. This is the equation of the limaçon. By substituting the values of R' given by Equation XVIII in the expression for $k$ and using this value of $k$ in the equation of the limaçon, the variation in directional response with passage thickness may be determined. The response is zero for the values of $\theta$ which make $\cos\theta = -k$. When $k$ equals one, that is, when Equation XIII holds, a cardioid directional pattern results. The value of $\cos\theta$ then equals $-1$ when $\theta$ equals 180° and there is no response from the rear of the microphone. This is the directional characteristic usually desired and the one to which I have given detailed consideration above. A plot of some of the other directional characteristics the microphone is capable of giving are shown in Figure 18. As $k$ is made less than one, the microphone maintains its unidirectional property, or preferential response to sound of 0° incidence, but a minor lobe corresponding to diminished response to sound of rear incidence occurs. The two angles of zero response, which may be thought of as being coincident for the special case of $k$ equals one, are symmetrically disposed with respect to 180° in the second and third quadrants. In the limit when $k$ equals zero, that is when R'C' equals RC, the null angles are 90° and 270° and the microphone becomes a cosine bidirectional type.

Figure 19:
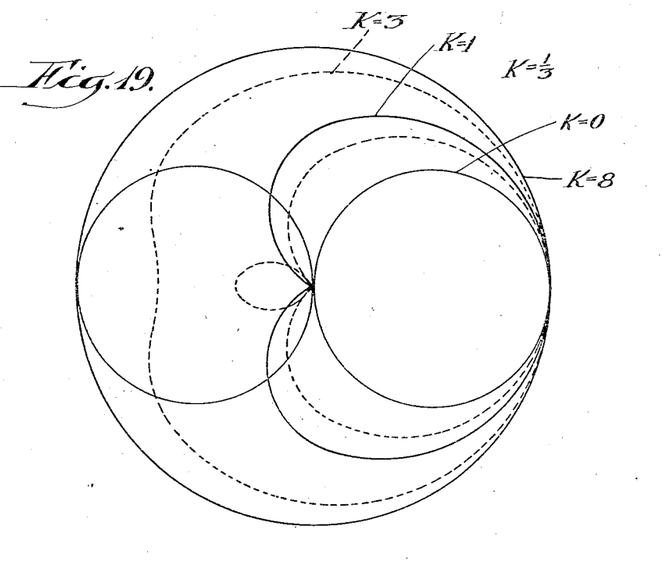
Fig. 19, a diagrammatic view of the space patterns obtained according to the invention.

The polar pattern shown in Figure 19 represents the response of the instrument in a plane through the principal axis of the microphone. The surface of revolution generated by rotating the curve about this axis represents the three dimensional response of the device. From this we note that when $k$ equals 1 the response is zero on the principal axis for sound of 180° incidence. As $k$ is reduced, the surface in which zero response occurs is a conical one, the internal solid angle of which increases as $k$ is reduced until in the limit when $k$ equals zero the surface becomes the plane of zero response in the resulting cosine bidirectional microphone. As the value of $k$ is made to exceed one, the surface of zero response disappears, although the microphone retains its unidirectional property until the limiting value of infinity is reached at which the microphone becomes nondirectional.

Since $d$ depends on the external shape of the microphone, as discussed above, and R and C are determined by the screen 26, and the volume of the cavity 27 respectively, the value of $k$ is most conveniently changed by altering the product R'C'. In the embodiment shown in Figure 6, $k$ is varied by adjusting screws 41 which alter the thickness of the passage 30 and thereby determines R'.

The resistance, R, of the screen, 26, is normally a small fraction of the resistance R', of the passage, 30, so that the sound wave has relatively free access to the front of the diaphragm. All unidirectional characteristics of the microphone between the nondirectional and the cosine bidirectional which are given by the equation for the limaçon are obtained by varying $k$ between zero and infinity. The value of infinity is obtained when the passage is closed. The value of zero is obtained when R'C' equals RC. Since the passage resistance varies inversely as the cube of the passage thickness, this latter adjustment is obtained with a thin passage even with low screen resistance. With a typical screen resistance in a structure of the type shown in Figure 6, a cardioid characteristic is obtained with a passage thickness of 0.01 cm. and a cosine bidirectional characteristic with a passage thickness of the order of 0.03 cm. so that all unidirectional characteristics are obtained by changing the passage thickness from zero to 0.03 cm. Because all of the desired directional properties are obtainable with a very thin passage 30, if the screen, 26, is properly chosen, the left hand side of Equation VIII may be made proportional to frequency over a relatively wide frequency range even when the passage thickness is altered to give different directional characteristics.

Figures 10, 12, 13:
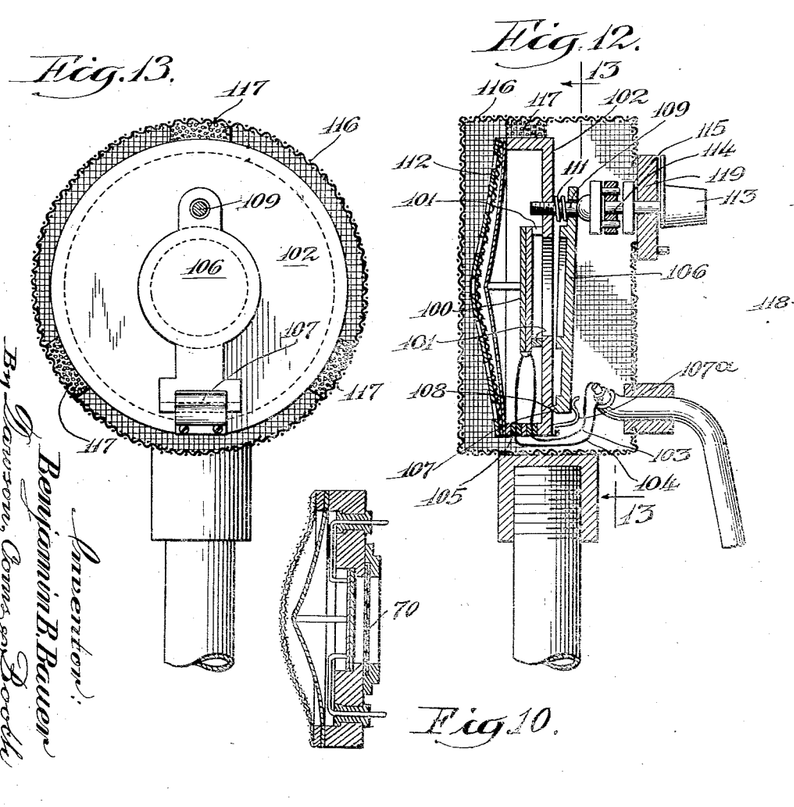
Fig. 10, a cross sectional view of a unidirectional crystal microphone equipped with an acoustical resistance formed of cloth.
Fig. 12, a sectional view taken as indicated at line 12 of Fig. 11.
Fig. 13, a sectional view taken as indicated at line 13 of Fig. 12.

Instead of obtaining resistance R' by means of the passage 31, it is possible to substitute the cover 29 with a suitable foraminous supporting member, such as a wire-screen disc having a number of thicknesses of cloth or felt or similar porous material attached to it, completely covering the opening 28, as shown more clearly in Fig. 10. The cloth illustrated is designated by the numeral 70. Fig. 10 is similar to Fig. 6 except as to the use of the cloth screen 70 in place of the narrow passage 31. By suitable choice of the thickness and porosity of the material employed, the proper value of acoustic impedance may be obtained. Sometimes it is difficult to select a material having the exact ratio of resistance to inertance specified in Equation IX; however, it is seen from Equation X that the squared terms are second-order terms in expansion for cosine function, and therefore the exact relationship between the inertance term L' and the resistance and capacitance terms R' and C' is not a vital one in obtaining the unidirectional operation of the instrument at low frequencies, and reasonable departure therefrom will affect the unidirectional action but slightly. The important adjustment, however, is the one between the terms expressed in Equation XIII.

I have mentioned previously that the Equation XII is valid up to frequencies at which $d$ is not larger than approximately one-quarter wavelength of sound. This corresponds, for the instrument of Fig. 6, to a frequency of approximately 2500 cycles per second. It should not be assumed, however, that above said frequency the unidirectional action ceases, because above 2500 cycles per second, the instrument tends to become highly unidirectional in favor of sounds arriving from the front because of diffraction and the so-called "baffle-effect" due to the size of the case 23. The unidirectional action is therefore obtained essentially throughout all of the important frequency range.

I have found that when a plane wave of constant intensity and varying frequency is impressed upon the front side of the instrument of Fig. 6, the resulting alternating force upon the crystal 24 is approximately proportional to frequency up to the frequency at which one-quarter wavelength equals the effective distance $d$, becoming approximately independent of frequency for frequencies at which one-quarter wavelength is larger than the effective distance $d$. Since the voltage developed in a crystal is proportional to the force applied, I found it useful to provide a compensating electrical network which would deliver an output voltage substantially independent of frequency at the receiving apparatus. This network consists of a parallel combination of a condenser 45 and a resistance 44, both in series with a larger condenser 46; said network is connected across the terminals 47 and 48 of the crystal, the receiver 49 being connected across the larger condenser.

Figure 9:
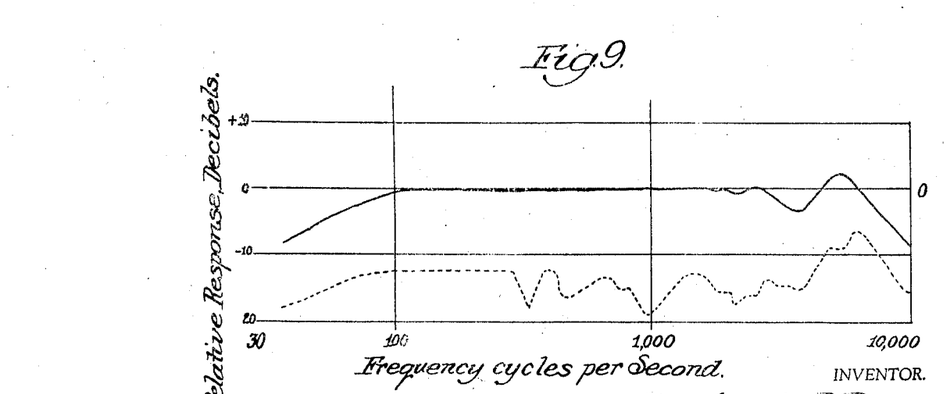
Fig. 9, a frequency response curve of the microphone shown in Fig. 6, the upper curve showing the front side response and the lower dotted line showing the decrease of response for the rear incidence sound.

Fig. 9 shows the frequency response obtained with this microphone and electrical network for plane wave incident upon the front (upper curve) and the rear (lower curve)) of the instrument, indicating the type of discrimination obtained at all frequencies. The polar directivity pattern is a cardioid shown in solid lines in Fig. 5.

It may be found convenient in many instances to provide the desired electrical compensation in the receiver 49. For applications in which it is desired to give predominance to higher frequencies of sound, the compensating network may be entirely dispensed with.

Figure 11:
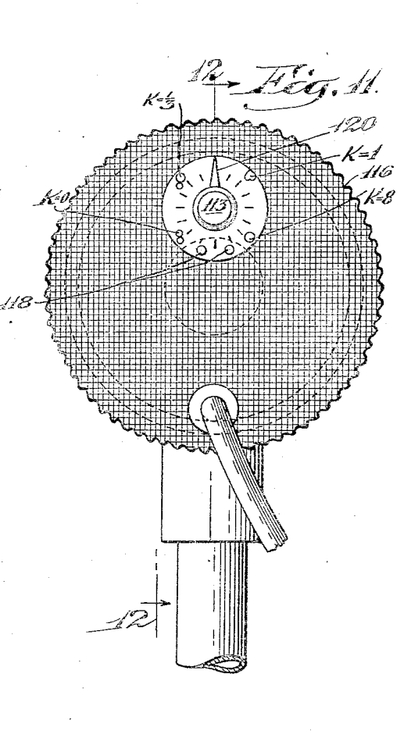
Fig. 11, a rear elevational view of another embodiment of the invention.
Figures 14, 15:
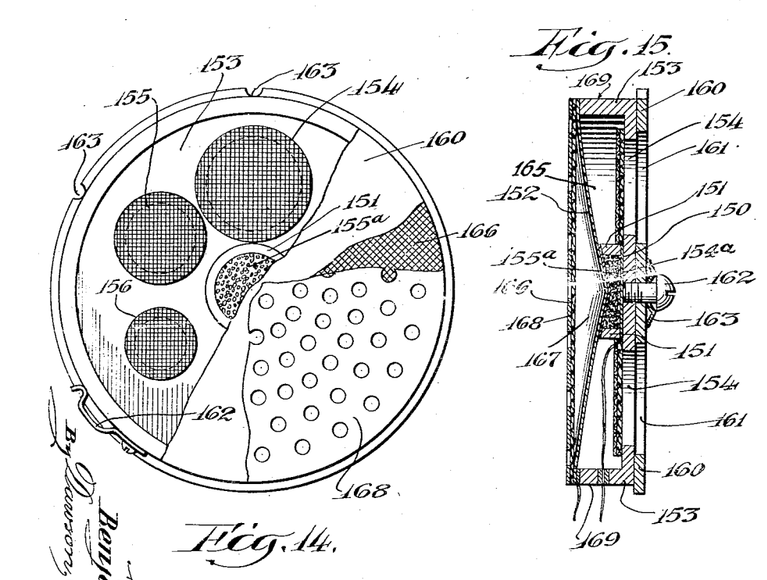
Fig. 14, a broken front elevational view of another embodiment of the invention.
Fig. 15, a sectional view, the section being taken as indicated at line 15 of Fig. 14.
Figure 16:
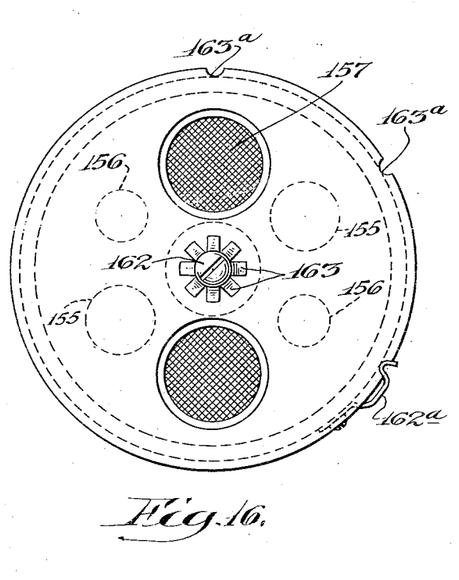
Fig. 16, a rear elevational view of the device shown in Figs. 14 and 15.
Figure 17:
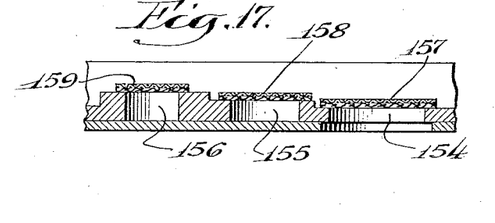
Fig. 17, a detail sectional view taken along the arcuate line 17 of Fig. 14.

Another embodiment of my invention is shown in Figures 11, 12 and 13. This embodiment may be compared with the embodiment shown in Figures 6 and 7, but differs therefrom in the provision of vibration insulated means for producing the adjustment of unidirectional characteristics, in means for limiting the range of this adjustment to a predetermined value, and in the provision of a scale to indicate the adjustment used.

In this embodiment, the crystal 100 is attached to support members 101 which are mounted on the casing 102. The leads 103 and 104 are brought out through insulating bushings 105 in the case 102. These leads are normally connected to an electrical network corresponding to that shown in Figure 6. The back plate 106 has a narrow elevated portion 107 which engages a groove 108 in the casing 102. The spring clip 107$^a$ serves to maintain contact between back plate 106 and the case 102. In this embodiment a single screw 109 is used to move the tiltable back plate 106 to and away from the casing, thus to adjust the size of the cavity enclosed by this plate and also to vary the size of the passages 110 between this plate and the casing. A spring 111 is employed for urging the back plate rearwardly against the screw 109. By using a properly selected front screen 112, and a normal kind of thread on the screw 109, it is possible to obtain the unidirectional characteristics given by the equation of the limaçon, up to the cosine bidirectional, with less than one complete revolution of the screw. A knob 113 is coupled to the screw 109 through a flexible coupling 114, in this case consisting of two discs, one being attached to screw 109 and the other to the shaft leading to knob 113. These discs each have two rigid pins set 180° apart, which engage a relatively soft compliant washer 114 which may be made of gum rubber, felt, or the like.

The casing 102 is supported in a perforate screen housing 116 by resilient pads 117 which may be made of sponge rubber, soft felt, or other suitable material. This mounting permits rotation of the knob 113 while the microphone is in operation without producing the very loud noises in the reproducing system which would otherwise result. When a loud speaker system connected to the microphone amplifier is located in the same room with this microphone, this structure permits the directional characteristic to be continuously altered until maximum discrimination against the sound which tends to produce sustained oscillations of the system, or a howl, is obtained. The pins 118 in the shaft and knob support 119, and the pointer 120, serve to limit the knob rotation to a predetermined value. In general, the thread of screw 109 and the location of pins 118 are so chosen that the permissible rotation of the knob closes passage 110 at one end and produces a cosine bidirectional characteristic at the other end of the rotation. This gives all values of $k$ from infinity to zero as discussed previously in connection with the operation of the device shown in Fig. 6. If the thickness of the passage 110 were further increased, it would reverse the unidirectional property and give preferential response to sound of rear incidence.

Figs. 14, 15, 16 and 17 represent still another embodiment of my invention. A carbon transducer is here employed, and the carbon granules 150 are contained in a cup 151 made of felt, paper or similar compressible material. The diaphragm 152 is cemented or otherwise held to the case 153. The diaphragm has a spot 150$^a$ made of gold, carbon, or similar non-corrosive conducting material attached to it at the center, and likewise the case has a conductive button 154$^a$ attached to it in a position corresponding to the button 155$^a$. A carbon cell is therefore formed consisting of the buttons 154$^a$ and 155$^a$, the circular elastic closure member 151, and the carbon granules 150.

The casing 153 has a plurality of apertures 154, 155 and 156 in it, which are progressively smaller in diameter and have progressively greater length. This is shown clearly in Fig. 17. It is seen that a decrease in hole diameter is accompanied by a corresponding increase of its depth or thickness. Each hole is covered with a foraminous screen designated by the characters 157, 158 and 159. These screens are chosen to have a predetermined resistance and inertance values. To the back of the casing 153, there is attached a circular shutter 160 provided with, in this case, two apertures 161. This shutter is held against the back of the case 153 by the screw 162 and compressible washer 163, so that it seals the apertures at all points except those corresponding with the apertures 161. A spring clip 162a is attached to the case 153 and engages indentations 163a in plate 160 in such a manner that proper alignment of holes 161 with holes 154, 155 and 156 may be readily obtained. It is seen that by rotating the plate 160 so that the holes 161 are aligned with the various holes in the case 153 it is possible to vary the ratio of resistance and inertance of the holes communicating with the volume 165 within the casing in such a manner that various directional patterns are obtained. Intermediate settings of shutter 160 may also be used to obtain partial closure of apertures 154, 155 and 156 to obtain other directional characteristics.

As pointed out previously, a foraminous screen, such as screen 70 in Fig. 10, may be used to provide resistance and inertance corresponding to the passage 31 of Fig. 6. A washer of foraminous material may be used to fill passage 31 and thereby increase its resistance for a given passage thickness. This may, in turn, be compressed an adjustable amount by moving the plate 29. However, I prefer to simultaneously alter the inertance and resistance of the passage in a predetermined manner.

Figure 4:
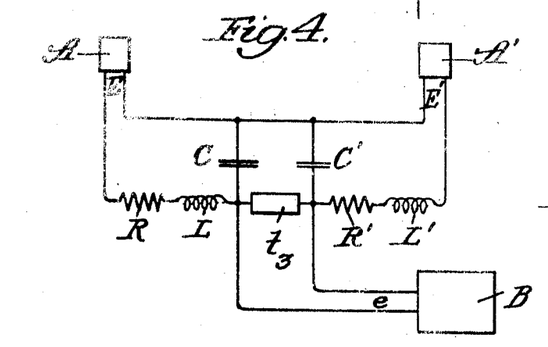
Fig. 4, a diagrammatic view of a specific embodiment comprehended within the diagram of Fig. 1.

This embodiment shown in Figures 14 to 17 is represented in its equivalent electrical network by Fig. 4. The acoustical elements given in Equation VII apply to the present embodiment as well as to the embodiment of Fig. 6. The front screens 166 and 168 of the instant device correspond to screen 26 of Fig. 6; the front cavity 167 to cavity 27 of Fig. 6; the diaphragm 152 to diaphragm 22 of Fig. 6; and cavity 165 to cavity 40 of Fig. 6.

An approximation of the ideal network elements which will give a shift in the phase of the sound waves which is proportional to frequency is given by Equation IX, and when the Equation VIII is satisfied, a cardioid unidirectional characteristic results. When the phase shifts of the vectors in the numerator and denominator of Equation VIII are proportional to frequency but their ratio is greater or less than the value given by Equation VIII, other directional characteristics given by the equation of the limaçon result. If the ratio of the left hand side of Equation VIII to the right hand side is zero, a cosine bi-directional characteristic results, and if this ratio is infinity, the microphone is non-directional. If any one directional characteristic is to be obtained over a substantial frequency range, then it is desirable to change both R' and L' simultaneously in such a manner as to produce a phase shift proportional to frequency over this substantial frequency range.

While the structure shown in Figs. 14 to 17 has only their pre-selected values of resistance and inertance, a large number may be provided, for example, by having apertures about the annular wall 169 of case 153 and providing a tight fitting rotatable sleeve with openings therein disposed about this annular wall to functionally replace the plate 160.

A further embodiment of my invention is shown in section in Fig. 18. In this structure, the adjustment of directional response is obtained by altering the volume of the cavity at the rear of the diaphragm and altering the effective space separation $d$ of the two sound wave responsive regions of the device. The transducer in this device is of the carbon type, but the crystal, ribbon, or other suitable transducer elements may be used.

The diaphragm 300 is attached by adhesive or other suitable means to the externally threaded casing 301. The casing carries a substantially circular current conducting beam or support 302, which is shown partially sectioned and fastened to the casing by screws 303 and insulating washers 304. The support 302 has a flat circular portion 305, the rear side of which is covered with gold or similar corrosion-resisting, current-conducting material. The diaphragm is similarly treated in a circular spot on the front side of the diaphragm 300 opposite the circular portion 305 of the support. The space between these surfaces is filled with carbon granules 306, which are retained in place by means of retaining felt washer 307. The button current is conducted by wires 308 and 309 which are attached to the bridge support 302 and casing 301. An internally-threaded sleeve 310 is screwed on the case 301. A perforate portion of this sleeve defines the cavity 311 at the rear of the diaphragm and carries the damping screen 313. This screen, together with the perforations 312, determined the resistance and inertance which couple the cavity 311 to the cylindrical cavity 318, which is freely exposed to the medium. A circular sleeve 314, open at both ends, snugly engages the inside surface of sleeve 310. A cross bar 315 is attached to the sleeve 314 and provides a convenient means of sliding sleeve 314 in and out of sleeve 310. A narrow slot 317 in the sleeve 310 limits the motion of sleeve 314 by engaging the pin 316 which is pressed in after the two sleeves are assembled.

As regards the factors which determine the directional property of this embodiment, it compares with the devices shown in Figures 6 and 13. The equivalent electrical circuit for this embodiment will be similar to that of Fig. 8 for the special case in which R, L and C are zero.

We have noted above in connection with the definition and discussion of the quantity $k$ that the directional pattern varies as $k$ is varied. Since $k$ involves C', R', C, R, $d$ and $C_v$, these all influence the directional property. Of these, all but the last, which is the phase velocity of the wave disturbance in the medium, is subject to control in the microphone. In this particular embodiment, C and R are zero, and we may theoretically vary C', R' and $d$. The value of C' is determined by the volume of cavity 311 and is varied by rotating sleeve 310 with respect to the case 301. When the cavity 311 is small, its relative volume is changed by a large factor when the sleeve 310 is rotated only slightly. As rotation is continued in such a direction as to increase the volume, the relative change in volume for a specified angular rotation of the sleeve decreases.

The effective space separation $d$ of the sound wave responsive regions of the microphone may also be altered to change the directional property. The advantage of this adjustment lies in the fact that the optimum circuit constants of the networks may be chosen to give a phase shift proportional to frequency over a relatively wide frequency range, and then the directional characteristic may be continuously altered over a predetermined interval without upsetting the optimum circuit constants which have been selected. A very close approach to this result requires the simultaneous change of L, R and C, or L', R' and C', as discussed in connection with the embodiment of Figs. 14, 15 and 16.

The limiting factor in the use of an adjustable separation $d$ lies in the upper frequency limitation. I have found experimentally that when a plane wave of 0° incidence passes the microphone, most of the phase shift in the sound field occurs near the outer corners, that is, near screws 303, and the rear corners of sleeves 310 and 314 in Fig. 18. Two instantaneous pressures, in the medium separated a distance $d$, maintain an in-phase component as the distance $d$ is increased from zero until $d$ equals a quarter wavelength. In the interval in which $d$ exceeds one-quarter and is less than three-quarter wavelengths, they have out-of-phase components. My invention in its preferred form therefore operates so that the networks produce a unidirectional property in the frequency interval in which $d$ is approximately a quarter wavelength or less. If $d$ is made large, this frequency range is more restricted. If the distance from the center of the front to the center of the back sound responsive region is considered, this will be approximately twice what I have called the effective distance $d$ since the phase of the sound field shifts very little from the center to the edge of the sound responsive regions for sound of normal incidence in the embodiments I have shown. It is customary in elementary field theory to consider that there is no difference in phase between the pressure on the diaphragm and at any point in its plane for a wave of normal incidence so that in an instrument which is thin in the direction of propagation of the wave and in which the diaphragm is small in comparison with its frame, the geometrical distance between the front and rear of the diaphragm could be a distance corresponding to one-half wavelength and yet the phase shift between the two corresponds to roughly a quarter wavelength in the undisturbed medium.

In the embodiment of Fig. 18, the distance $d$ may be varied either by screwing sleeve 310 in or out, which also changes the volume of the cavity 311; or it may be varied by moving sleeve 314. If the volume of the cavity 311 is to be varied independently of the distance $d$, the position of sleeve 314 may be readjusted after sleeve 310 is moved to restore the original value of $d$. If $d$ is to be varied independently of C, then the position of sleeve 314 is altered. By properly proportioning the diameter and depth of the structure and the thread on the case and external sleeve, the instrument may be made to provide a predetermined range of directional adjustment. The distance $d$ may be altered by other means, as, for example, by having external vanes on the case which open out, employing a principle similar to that used in an iris diaphragm of a photographic objective, except that the vanes move out rather than in. Other mechanical arrangements may be applied, as desired.

While I have shown and described in detail many specific embodiments of the invention, other and widely different structures may be made, all within the spirit of the invention. The foregoing detailed description is given for purpose of explanation only and is not to be taken in a limiting sense.

I claim:

1. In a sound translating device, a moving body adapted to vibrate and convert its vibrations into electrical variations, said body being sensitive to sound waves emitted from a sound source in an elastic medium, structure which for waves of normal front incidence adds an equivalent acoustical distance to one pressure component of said waves to which said body is sensitive, and an acoustical network imparting to said component a phase shift bearing a constant ratio to the phase change which takes place due to said waves travelling said distance in said medium throughout a substantial range of frequencies, a cavity forming a part of said network the rear wall of which is a plate which is movable to vary the capacitance of said cavity, and means for moving said plate to adjust said network and vary said ratio.

2. In a sound translating device, a moving body adapted to vibrate and convert its vibrations into electrical variations, said body being sensitive to sound waves emitted from a sound source in an elastic medium, structure which for waves of normal front incidence adds an equivalent acoustical distance to one pressure component of said waves to which said body is sensitive, an acoustical network imparting to said component a phase shift bearing a constant ratio to the phase change which takes place due to said waves travelling said distance in said medium throughout a substantial range of frequencies, and means for varying said structure to change the value of said equivalent acoustical distance and so change said ratio.

3. In a sound translating device, a moving body having means for converting its vibrations into electrical variations, said body having at least two sound sensitive areas separated by an equivalent acoustical distance, an acoustical network imparting to sound waves having access to one of said areas a phase shift which bears a constant ratio to the phase change which takes place due to said waves travelling said distance throughout a substantial range of frequencies, a cavity forming a part of said network, means for adjusting said cavity to alter the capacitance of said network, and means for adjusting said equivalent acoustical distance, each of said adjusting means being effective to alter said ratio.

4. In a sound translating device, a moving body having means for converting its vibrations into electrical variations, said body having a plurality of sound sensitive areas, an acoustical network imparting to sound waves having access to one of said areas a phase shift, an apertured wall which bounds a cavity adjacent said one area, said cavity forming a part of said acoustical network, and means for closing a portion of the area of said apertures to thereby alter the capacitance of said cavity and the phase shift produced by said network.

5. In a sound translating device, a moving body having means for converting its vibrations into electrical variations, said body having a plurality of sound sensitive areas, an acoustical network imparting to sound waves having access to one of said areas a phase shift, a cavity forming a part of said network, a wall forming one of the sides of said cavity and having apertures therein, and a movable plate adjacent said wall having an opening therein, said plate being movable to bring said opening into alignment with one of said apertures.

6. A device as set forth in claim 5, in which said wall has apertures of varying areas and wherein said plate is movable to bring said opening into alignment with apertures of different areas.

7. A device as set forth in claim 5, in which said wall has apertures of varying areas and thicknesses, the larger sizes having the greater thickness, and in which said plate is movable to bring said opening into alignment with apertures of different areas and thickness.

8. A device as set forth in claim 5, in which said wall has apertures of varying areas which are covered with acoustical screens, and wherein said plate is movable to bring said opening into alignment with apertures of different areas.

9. A device as set forth in claim 5, in which said wall has apertures of different areas in circular arrangement, which said plate is rotatable about an axis concentric with said arrangement.

10. In a sound translating device, a moving body having means for converting its movements into electrical variations, said body having at least two sound sensitive areas, an acoustical screen spaced from one of said areas and forming one wall of a cavity adjoining said one area, said screen and cavity providing acoustical network operative on the sound waves having access to said one area and effective to shift the phase of sound waves having access to said one area, an acoustical network operative on the sound waves having access to said other area and effective to shift the phase of sound waves having access to said other area, a cavity forming a part of said last mentioned acoustical network, and means for adjusting the acoustical capacitance of said cavity to thus alter said last mentioned network and change the extent to which sound waves having access to said other area are shifted.

11. In a sound translating device, a moving body having means for converting its movements into electrical variations, said body having a plurality of sound sensitive areas, an acoustical network imparting to sound waves having access to one of said areas a phase shift, and rotatable means for adjusting the character of said network to thus alter the phase shift produced.

12. In a sound translating device, a moving body having means for converting its movements into electrical variations, said body having a plurality of sound sensitive areas, an acoustical network imparting to sound waves having access to one of said areas a phase shift, a passage forming a part of said network, tiltable means controlling the thickness of said passage and therefore the phase shift produced by said network, and means for tilting said tiltable means to adjust the thickness of said passage.

13. In a sound translating device, a movable body having means for converting its movements into electrical variations, said body having a plurality of sound sensitive areas, an adjustable acoustical network imparting to sound waves having access to one of said areas a phase shift, rotary means for adjusting said network to vary the extent to which said sound waves are shifted, and means associated with said rotary means for indicating the relative shift in phase produced by said network.

14. In a sound translating device, a movable body adapted to vibrate and convert its vibrations into electrical variations, said body being sensitive to sound waves emitted from a sound source in an elastic medium, structure which for waves of normal front incidences provides an equivalent acoustical distance to one pressure component of waves to which said body is sensitive, and an acoustical network imparting to said component a phase shift bearing a constant ratio to the phase change which takes place due to said waves travelling said distance in said medium throughout a substantial range of frequencies, said network being adjustable to change said ratio, and means for indicating the approximate value of said ratio.

15. In a sound translating device, a movable body adapted to vibrate and convert its vibrations into electrical variations, said body having a plurality of sound sensitive areas, an acoustical network imparting to sound waves having access to one of said areas a phase shift, an apertured movable wall which bounds a cavity adjacent said one area, said cavity forming a part of said acoustical network, and means for moving said wall with respect to said one area thus to alter the size of said cavity, alter the character of said network, and so adjust the extent of said phase shift.

16. In a sound translating device, a movable body adapted to vibrate and convert its vibrations into electrical variations, said body having a plurality of sound sensitive areas, an acoustical network imparting to sound waves having access to one of said areas a phase shift, a movable wall which bounds a cavity adjacent said one area, said cavity forming a part of said acoustical network, and means effective upon rotation of said wall for moving said wall with respect to said one area thus to alter the size of said cavity, alter the character of said network, and so adjust the extent of said phase shift.

17. In a sound translating device, a casing member having a cylindrical interior, a movable body carried by said casing member and equipped with means for converting its vibrations into electrical variations, said body having a plurality of sound sensitive areas, a wall of circular cross section within said casing member and movable axially of said cylindrical interior, said wall forming with said casing member and one area of said movable body a cavity which has an acoustical capacitance effect on sound waves having access to said one area, and means in threaded engagement with said casing member for moving said wall axially of said casing member when rotated with respect to said casing member, thereby to alter the size of said cavity and the capacitance effect on said sound waves.

18. A device as set forth in claim 17 and including also a sleeve member which is movable axially of said casing member and effective upon such movement to alter the effective acoustical distance between waves having access to two of said sound sensitive areas.

BENJAMIN B. BAUER.

CERTIFICATE OF CORRECTION.

Patent No. 2,305,598. December 22, 1942.

BENJAMIN B. BAUER.

It is hereby certified that the name of the assignee in the above numbered patent was erroneously described and specified as "S. N. Shure and Frances Shure, Trustees, doing business as Shure Brothers, a partnership" whereas said name should have been described and specified as --S. N. Shure and Frances Shure, Trustee, doing business as Shure Brothers, a partnership--, as shown by the record of assignments in this office; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.